United States Patent
Sasaki et al.

(10) Patent No.: US 6,844,988 B2
(45) Date of Patent: Jan. 18, 2005

(54) LENS BARREL DEVICE

(75) Inventors: Ryota Sasaki, Saitama (JP); Yuichi Kawanabe, Saitama (JP); Yuji Fukushima, Kasukabe (JP)

(73) Assignee: Fujinon Corporation, Saitama (JP)

(*) Notice: Subject to any disclaimer, the term of this patent is extended or adjusted under 35 U.S.C. 154(b) by 120 days.

(21) Appl. No.: 10/409,155

(22) Filed: Apr. 9, 2003

(65) Prior Publication Data

US 2003/0202262 A1 Oct. 30, 2003

(30) Foreign Application Priority Data

Apr. 24, 2002 (JP) .................................. 2002-122241

(51) Int. Cl.[7] .............................................. G02B 15/14
(52) U.S. Cl. ...................................... 359/704; 359/706
(58) Field of Search ........................ 359/694, 699–704, 359/706, 813, 815, 819, 822, 826

(56) References Cited

U.S. PATENT DOCUMENTS

| 5,502,597 A | 3/1996 | Estelle et al. | |
|---|---|---|---|
| 5,537,262 A | * 7/1996 | Aoki et al. | 359/822 |
| 6,416,240 B1 | 7/2002 | Johnson | |
| 6,643,074 B2 | * 11/2003 | Nomura et al. | 359/700 |

* cited by examiner

Primary Examiner—Hung Xuan Dang
Assistant Examiner—Tuyen Tra
(74) Attorney, Agent, or Firm—Arnold International; Jon W. Henry; Bruce Y. Arnold

(57) ABSTRACT

A lens barrel device includes a lens mounted in a lens frame that is threaded into an annular adjusting ring. The adjusting ring is coupled using a bayonet to a lens barrel. The lens barrel includes first and second flanges on the inner periphery of the lens barrel that define grooves for receiving bayonet projections on the annular adjusting ring. The bayonet coupling structure of the annular adjusting ring includes semispherical projections for elastically engaging inner walls of the grooves and also includes a rotation regulating stopper for engaging an end wall of an opening in one of the inner flanges so as to regulate rotation of the annular adjusting ring, and hence the lens, relative to the lens barrel. The end wall includes a groove for receiving a jig that can release the bayonet coupling structure of the annular adjusting ring from the lens barrel.

20 Claims, 9 Drawing Sheets

LENS BARREL DEVICE

BACKGROUND OF THE INVENTION

Conventionally, in lens barrels that include a lens supporting structure for holding the lens and moving the lens along the optical axis of the lens barrel, a lens frame holds the lens and is screwed into an adjusting ring that is mounted on the lens barrel, and a bayonet-type structure is used as the mounting structure of the adjusting ring to the lens barrel. For example, three projections formed at equal spacings around the outer periphery of the adjusting ring are aligned with three notches of three grooves formed around the inner periphery of the lens barrel. The three projections are passed through the notches, and the adjusting ring is rotated so the projections rotate in the grooves so that the projections are no longer aligned with the notches. Moreover, leaf springs are provided between the projections and the grooves so that the rotation of the adjusting ring presses the projections against the leaf springs that bend to exert a holding force between the adjusting ring and the lens barrel.

In such a conventional arrangement, adjustment along the optical axis is first achieved by rotating the lens frame in a screw connection with the annular adjusting ring that moves the lens frame back and forth along the optical axis to vary the spacing of the lens mounted in the lens frame and other lenses. Next, the lens is moved in a plane perpendicular to the optical axis by changing the fitting positions of the bayonet-type projections and grooves, for example, by rotating the adjusting ring by 120 degrees to align different projections and notches until the connection that optimizes the centering of the lens on the optical axis is achieved. When the optimum alignment is found, an adhesive is coated in the bayonet grooves at the optimum position to bond the adjusting ring to the lens barrel, thus completing the optical axis adjustment operation of the lens and the lens barrel.

According to the above method, it is necessary to rotate the lens around the optical axis in order to find the optimum position. When the lens frame is rotated relative to the annular adjusting ring in order to obtain the proper position of the lens along the optical axis, the force is transmitted to the annular adjusting ring and may cause it to rotate relative to the lens barrel. In this case, there has been the drawback that the leaf springs revolve together with the annular adjusting ring due to the frictional resistance with the annular adjusting ring. If the direction of rotation of the annular adjusting ring is in the same direction as the direction of releasing the annular adjusting ring from the lens barrel, the tight connection between the annular adjusting ring and the lens barrel intended to be provided by the leaf springs is loosened. This increases the time required to make the proper optical axis adjustments.

Moreover, the leaf springs are provided for the original optical axis adjustment, but they are not needed after the adjustment is fixed by adhesive. However, the leaf springs cannot be removed and thus they remain in the lens barrel even though they no longer serve a useful purpose.

BRIEF SUMMARY OF THE INVENTION

The present invention relates to a lens barrel device that enables adjustment of a lens along the optical axis of the lens barrel device without requiring the use of leaf springs.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

An embodiment of the lens barrel device of the present invention and its method of assembly that is also part of the present invention will be described with reference to the drawings. In the following description, elements that are essentially identical, except for their location, may be denoted by the same reference symbol that may be recited only once when the essentially identical elements are being referenced.

Figure 1:
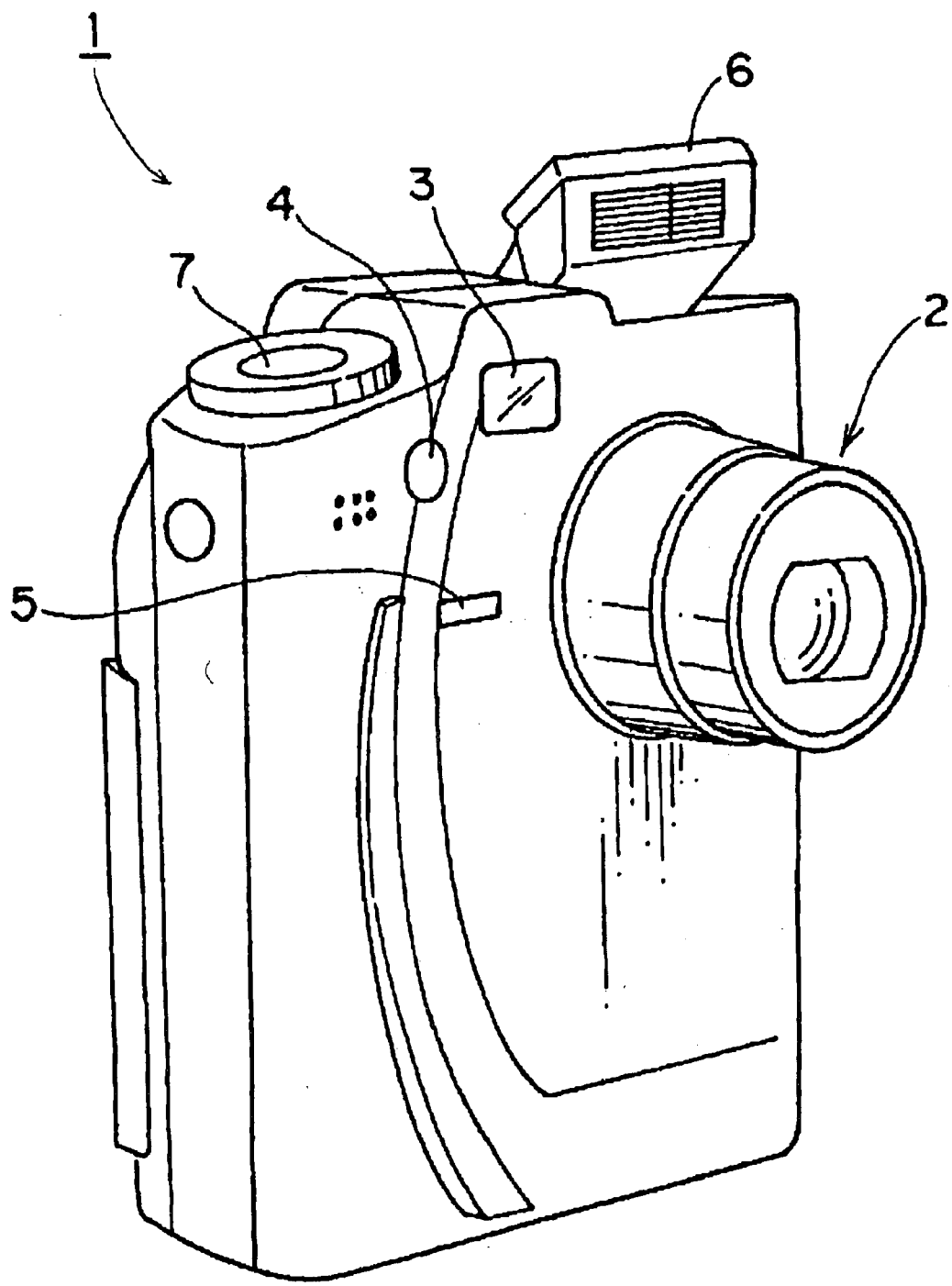
FIG. 1 is a front perspective view that shows an electronic still camera with an embodiment of the lens barrel device of the present invention.

FIG. 1 is a front perspective view that shows an electronic still camera with an embodiment of the lens barrel device of the present invention. As shown in FIG. 1, the electronic still camera 1 has a generally rectangular shaped body that carries a lens barrel device 2, a finder window 3, a strobe light adjusting sensor 4, and a self-timer 5 on the front, and a pop-up strobe 6 and a release switch 7 on the top. A finder ocular, a liquid crystal panel, and an operation panel, which are not shown, may conventionally be on the back of the camera. The electronic still camera 1 is of the retractable lens type, and, as shown in FIG. 1, the lens barrel device protrudes from the front with the lens barrel device extended from the camera body for use.

Figure 2:
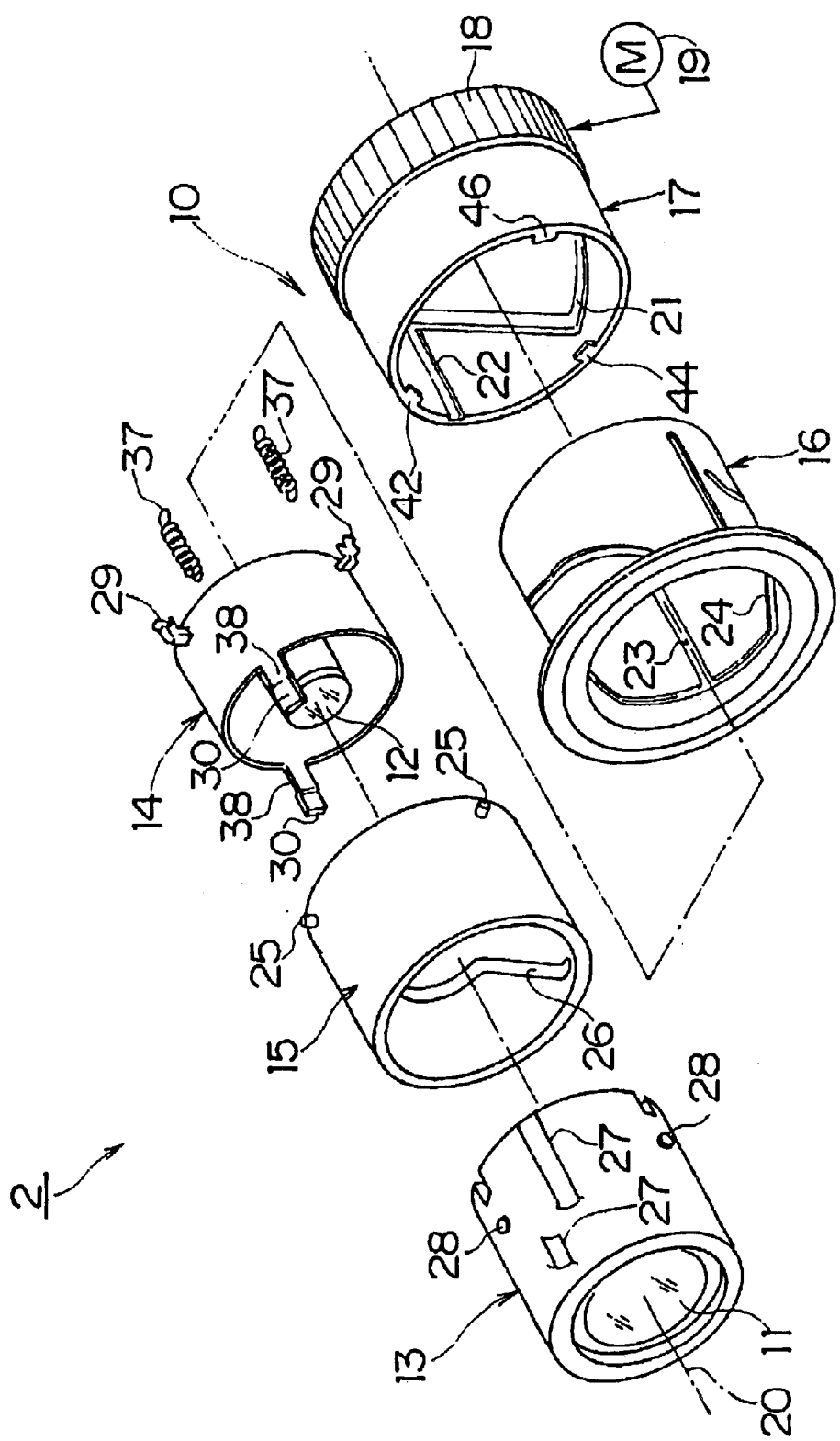
FIG. 2 is an exploded perspective view of the lens barrel device of FIG. 1.
Figure 3:
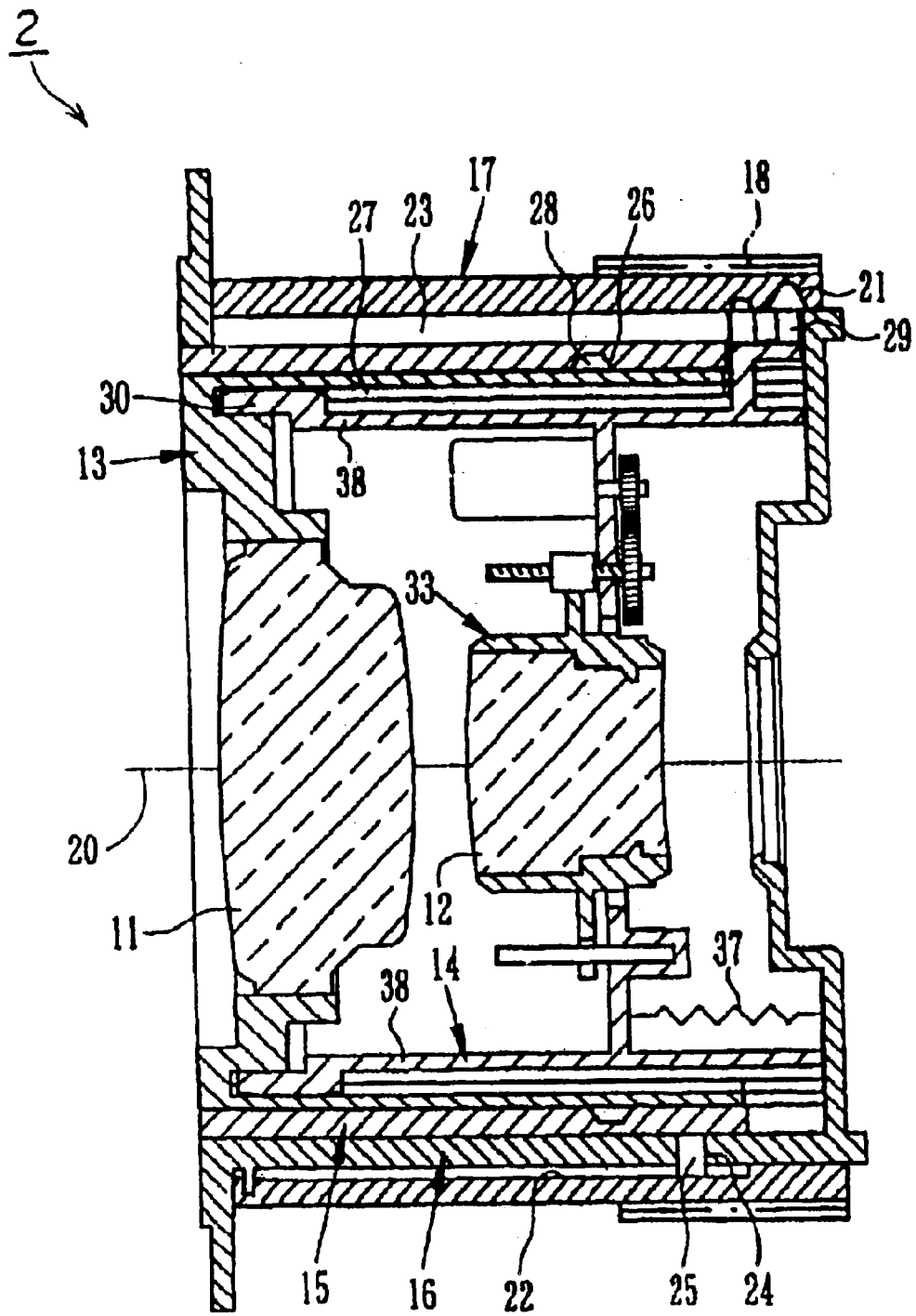
FIG. 3 is a cross-sectional side view along the optical axis of the lens barrel device of FIG. 1 at the retracted position.
Figure 4:
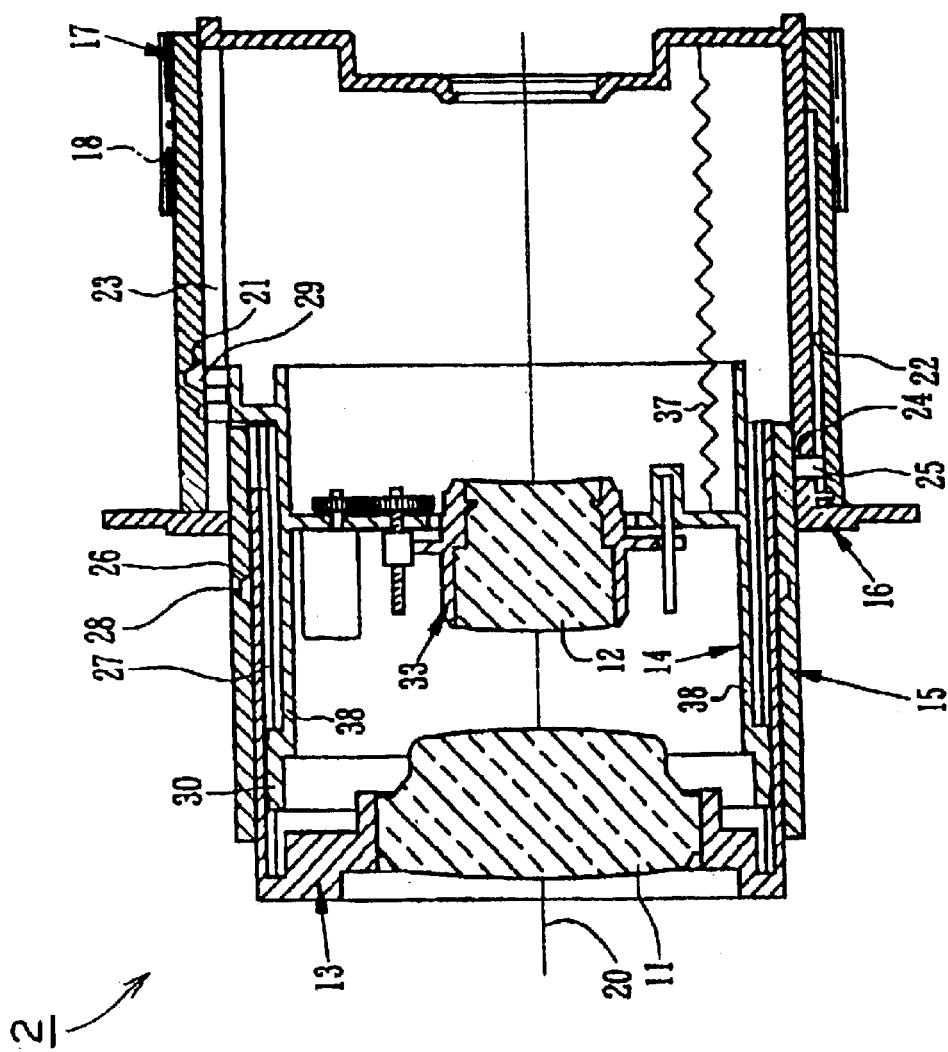
FIG. 4 is a cross-sectional side view along the optical axis of the lens barrel device of FIG. 1 at the telephoto position.
Figure 5:
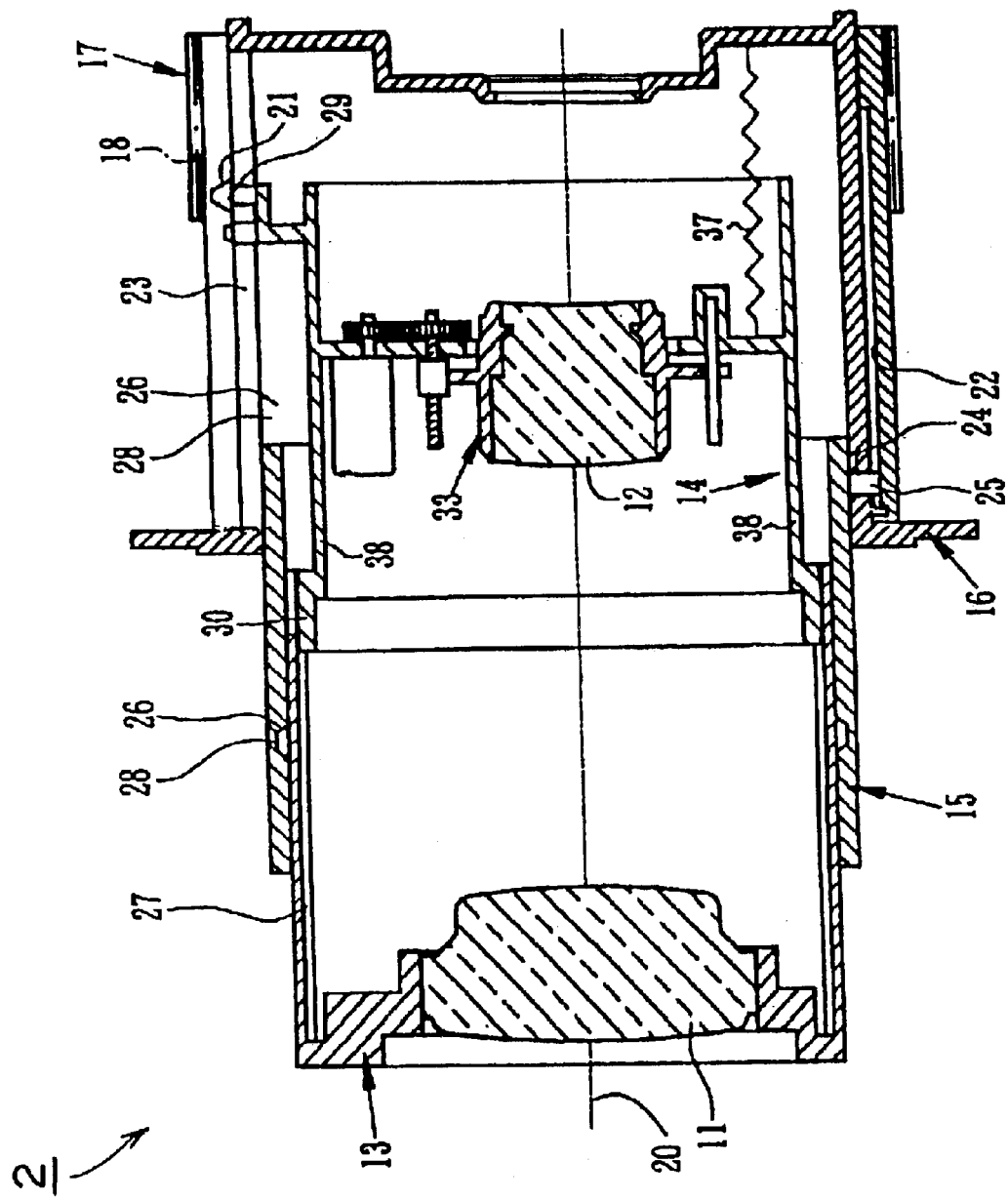
FIG. 5 is a cross-sectional side view along the optical axis of the lens barrel device of FIG. 1 at the wide-angle position.

FIG. 2 is an exploded perspective view of the lens barrel device of FIG. 1. FIGS. 3 to 5 are cross-sectional side views along the optical axis of the lens barrel device 2 of FIG. 1. FIG. 3 shows the lens barrel device 2 at the retracted position, and FIGS. 4 and 5 show the lens barrel device 2 at the telephoto and wide-angle positions, respectively.

As shown in FIGS. 2 to 5, the lens barrel device 2 includes a first lens 11, a second lens 12, a first lens barrel 13, a second lens barrel 14, a movable barrel 15, a fixed barrel 16, and a rotatable barrel 17. The first lens 11 includes an optical axis that preferably coincides with optical axis 20 defined in terms of precise alignment with a CCD imaging element (not shown in the drawings).

Figure 6:
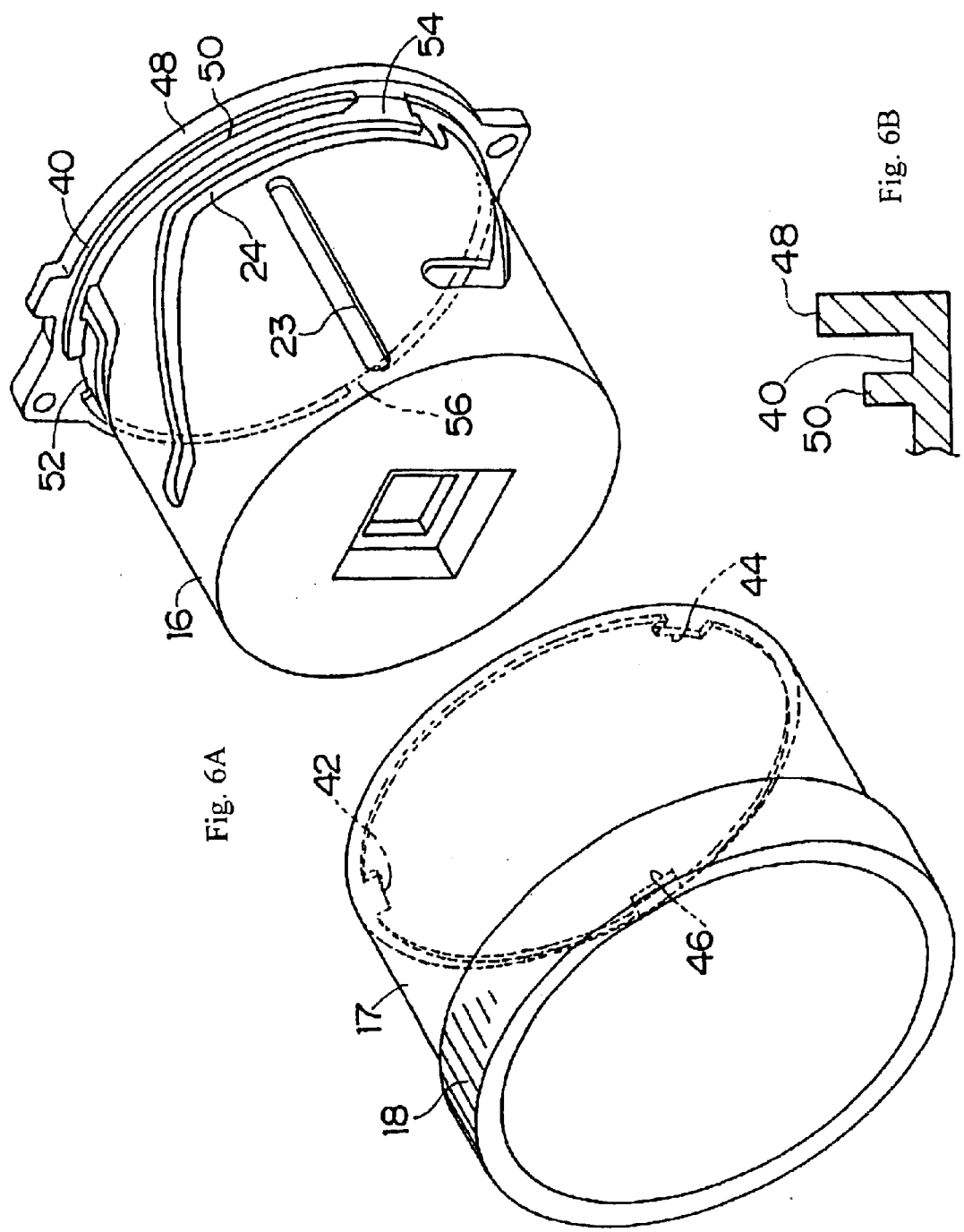
FIG. 6A is an enlarged exploded perspective view of the fixed barrel and rotatable barrel of the lens barrel device of FIG. 1.
FIG. 6B is an enlarged cross-sectional view of a portion of the fixed lens barrel of FIG. 6A.

FIG. 6A is an enlarged exploded perspective view of the fixed barrel 16 and the rotatable barrel 17 of the lens barrel device of FIG. 1. FIG. 6B is an enlarged cross-sectional view of a portion of the fixed barrel 16 of FIG. 6A. As shown in FIG. 6A, the rotatable barrel 17 is supported with free rotation by the fixed barrel 16 aligned generally along the optical axis 20 in positions determined by the engagement of projections 42, 44, 46 formed on the inner periphery of the rotatable barrel 17 with grooves 40 formed around the outer periphery of the fixed barrel 16. The grooves 40 of the fixed barrel 16 are formed between a flange 48 and a projecting strip 50 formed at one end of the fixed barrel 16. Three notches 52, 54, 56 are formed in the projecting strip 50, and the three projections 42, 44, 46 are engaged with the grooves 40 via the notches 52, 54, 56.

As shown in FIG. 2, a gear 18 is formed on the outer periphery of the rotatable barrel 17. The drive of a zoom motor 19 is transmitted to the gear 18 in order to rotate the rotatable barrel 17 while it is in contact with the outer periphery of the fixed barrel 16. The state of the lens barrel device 2 of FIG. 2 is changed from the retracted barrel position shown in FIG. 3 to the telephoto position shown in FIG. 4 by rotating the rotatable barrel 17 to achieve the lens positions shown in FIG. 4. Further rotation of the rotatable barrel 17 from the telephoto position to the wide-angle position produces the wide-angle positions of the lenses shown in FIG. 5.

Second lens cam grooves 21 for moving the second lens barrel 14 in the direction of the optical axis 20 and guide grooves 22 for guiding the movable lens barrel 15 in the direction of the optical axis 20 without rotation relative to the rotatable barrel 17 are formed at the inner periphery of the rotatable barrel 17. These second lens cam grooves 21 and guide grooves 22 are formed at three equally spaced positions around the optical axis 20.

Second lens guide grooves 23 for guiding the second lens barrel 14 in the direction of the optical axis 20 without rotation and movable barrel cam grooves 24 for moving the movable barrel 15 in the direction of the optical axis 20 are formed on the inner periphery of the fixed barrel 16. The second lens guide grooves 23 and the movable barrel cam grooves 24 are formed at three equally spaced positions around the optical axis 20.

Movable barrel cam pins 25 are provided on the outer periphery of the movable barrel 15. These movable barrel cam pins 25 are provided at three equally spaced positions around the optical axis 20 and engage with the movable barrel cam grooves 24 formed on the fixed barrel 16 and the movable barrel guide grooves 22 formed on the rotatable barrel 17. If the rotatable barrel 17 is rotated, the movable barrel 15 is moved in the direction of the optical axis 20 while rotating around the fixed barrel 16 by the action of the movable barrel cam grooves 24 and the movable barrel guide grooves 22.

First lens cam grooves 26 for moving the first lens barrel 13 in the direction of the optical axis 20 are formed on the inner periphery of the movable barrel 15. The first lens cam grooves 26 are provided at three positions equally spaced around the optical axis 20. Guide grooves 27 are formed on the inner periphery of the first lens barrel 13 so that they are parallel to the optical axis and engage with guide projections 30 formed on the second lens barrel 14. First lens cam pins 28 are provided on the outer periphery of the first lens barrel 13 at positions around the optical axis 20 so that they engage with the first lens cam grooves 26 formed on the inner periphery of the movable barrel 15. When the movable barrel 15 is rotated, the first lens barrel 13 is moved relative to the second lens barrel 14 generally along the optical axis 20 by interaction of the first lens cam grooves 26 and the guidance of the guide projections 30 of the second lens barrel 14.

Second lens cam pins 29 are provided on the outer periphery of the second lens barrel 14 at positions around the optical axis 20 so that they with engage the second lens cam grooves 21 of the rotatable barrel 17 and the second lens guide grooves 23 of the fixed barrel 16. When the rotatable barrel 17 is rotated, the second lens barrel 14 is moved generally along the optical axis 20 relative to the fixed barrel 16 by the action of the second lens cam grooves 21 of the rotatable barrel 17 and the second lens guide grooves 23 of the fixed barrel 16. Additionally, a pair of springs 37, 37 connect the second lens barrel 14 to the fixed barrel 16. The springs 37, 37 are provided at certain positions around the optical axis 20 so that the second lens barrel 14 is biased toward the image plane side.

Furthermore, a pair of arms 38, 38 are integrally formed on one side of the optical axis on the outer part of the front end, that is, the object side, of the second lens barrel 14. The arms 38, 38 extend from the front end of the second lens barrel 14 parallel to the optical axis 20 in their lengthwise direction, and each arm 38 includes a guide projection 30 that includes a guide member integrally formed at the outer periphery of the front end of each arm 38. The guide projections 30 engage with the guide grooves 27 formed on the inner periphery of the first lens barrel 13. The first lens barrel 13 is guided back and forth along the optical axis 20 by the second lens barrel 14.

Figure 7:
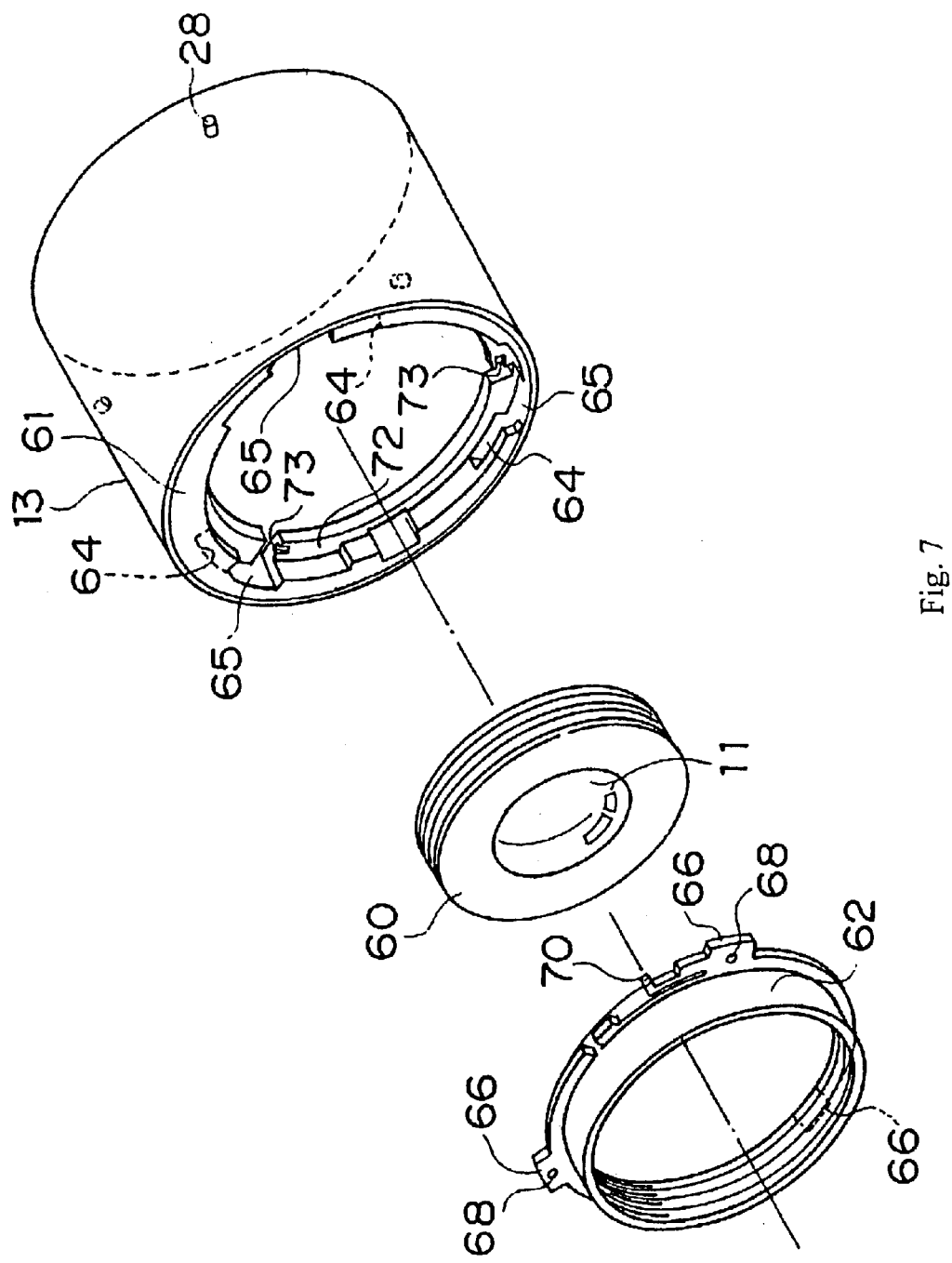
FIG. 7 is an enlarged exploded perspective view of the first lens, the lens frame, the annular adjusting ring, and the first lens barrel of the lens barrel device of FIG. 1.

As shown in FIGS. 3–5, the first lens 11 is mounted in the first lens barrel 13 with its optical axis closely matched to the optical axis 20 that extends to a CCD (not shown in the drawings). FIG. 7 is an enlarged exploded perspective view of the first lens and lens frame, the annular adjusting ring, and the first lens barrel of the lens barrel device of FIG. 1.

Figure 8:
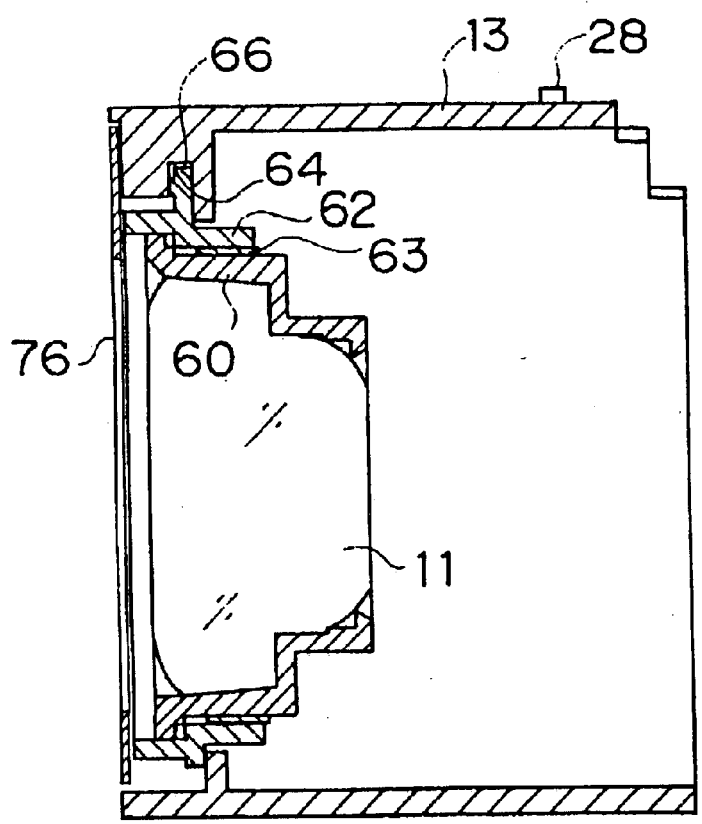
FIG. 8 is an enlarged cross-sectional view of the assembled first lens, lens frame, adjusting ring, and first lens barrel of the lens barrel device of FIG. 1.
Figure 9:
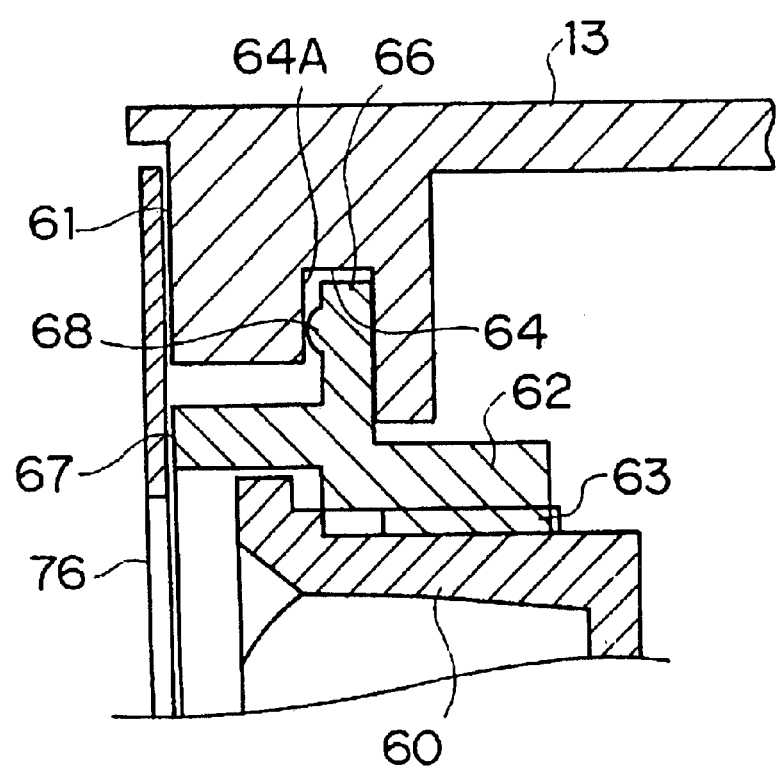
FIG. 9 is a further enlarged cross-sectional view of a portion of FIG. 8.

As shown in FIG. 7, the first lens 11 is mounted in a lens frame 60 that is mountable in the annular adjusting ring 62 that, in turn, is mountable in the first lens barrel 13. FIG. 8 is an enlarged cross-sectional view of the assembled lens 11, lens frame 60, annular adjusting ring 62, and first lens barrel 13. FIG. 9 is a further enlarged cross-sectional view of a portion of FIG. 8. The lens frame 60 is connected to the inner periphery of the annular adjusting ring 62 via mating screw threads 63 on the lens frame 60 with screw threads on the annular adjusting ring 62. Because FIGS. 3–5 merely show a general view of the mechanical connections of the lens barrel device, the first lens barrel 13 appears to be a one piece structure holding the lens 11 because an illustration of the lens frame 60 and annular adjusting ring 62 (as well as the detailed shape of the first lens 11) has been omitted for simplicity of illustration.

As shown in FIG. 7, the first lens barrel 13 and the annular adjusting ring 62 are connected by a first coupling structure on the inner periphery on the first lens barrel 13 and a second coupling structure on the other periphery of the annular adjusting ring 62. The coupling structures include three bayonet projections 66 formed on the outer periphery of the annular adjusting ring that are fitted into three bayonet grooves 64 formed in an inner peripheral flange 61 of the first lens barrel 13. The three notches 65 are also formed in the inner peripheral flange 61 on the front of the first lens barrel 13, and the three bayonet projections 66 are fitted into the three bayonet grooves 64 via the three notches 65. As shown in FIG. 7A, an inner flange 72 extends on the inner periphery of the first lens barrel 13 and forms an inner side of each bayonet groove 64.

Additionally, semispherical elastic engagement components 68 are formed as protrusions on first portions of the bayonet projections 66. As shown in FIGS. 8 and 9, when the bayonet projections 66 are fitted into the bayonet grooves 64, the elastic engagement components 68 engage with an inner wall surface 64A of the bayonet grooves 64 with elastic or plastic deformation.

Figure 10A:
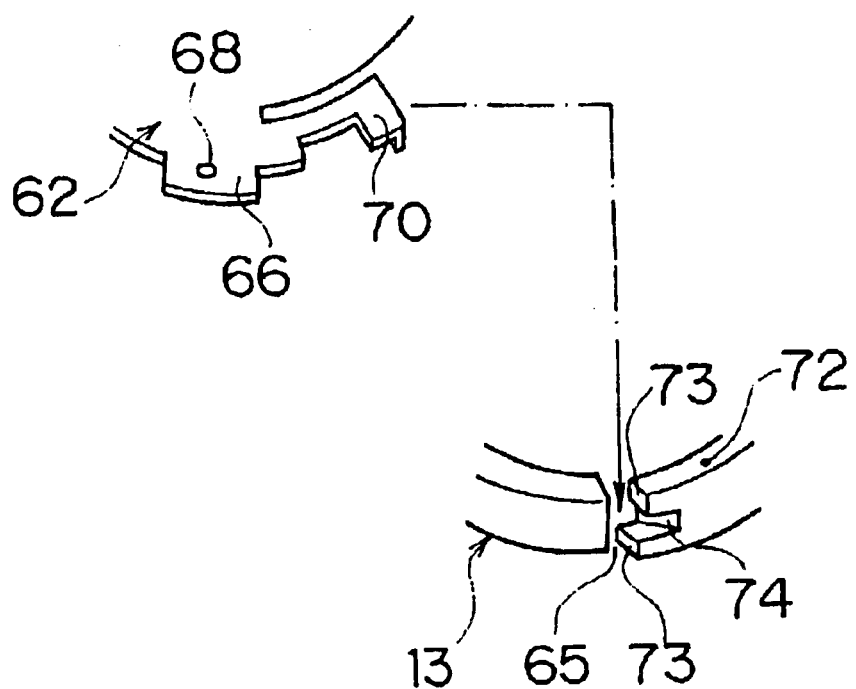
FIG. 10A is an enlarged exploded perspective view of a rotation regulating stopper and a mating portion of the first lens barrel of the lens barrel device of FIG. 1.
Figure 10B:
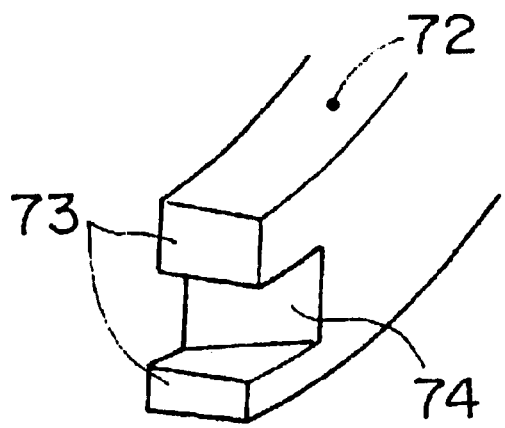
FIG. 10B is a further enlarged perspective view of a portion of the first lens barrel shown in FIG. 10A.

Furthermore, as shown in FIG. 7, a rotation regulating stopper 70, which is a regulating member, is integrally formed on a second portion of one bayonet projection 66 of the three bayonet projections 66. FIG. 10A is an enlarged exploded view of the rotation regulating stopper 70 and a mating portion of the first lens barrel 13. FIG. 10B is a further enlarged perspective view of a portion of the first lens barrel 13 shown in FIG. 10A. When the bayonet projection of the annular adjusting ring 62 is inserted into one of the three notches 65 and rotated into the bayonet groove 64 of the first lens barrel 13, the rotation regulating stopper 70 engages an opening partially defined by the end surface 73 formed on the inner flange 72. This regulates the rotation of the annular adjusting ring 62 within the first lens barrel 13.

As shown in FIGS. 10A–10B, a jig insertion groove 74 is formed in the end surface 73 of the inner flange 72. The engagement of the rotation regulating stopper 70 with the end surface 73 can be released with a jig by inserting the jig into the jig insertion groove 74.

Additionally, as shown in FIG. 8, an annular decorative sheet 76 is mounted to the front of the first lens barrel 13. As shown in FIG. 9, the decorative sheet 76 is bonded to the inner peripheral flange 61 of the first lens barrel 13 and a left side circular end face 67 of the annular adjusting ring 62 is extended so as to be coplanar with the front end of the inner peripheral flange 61.

Next, the optical axis adjusting operation of the first lens 11 for the first lens barrel 13 constructed as described above will be explained. First, the lens frame 60 that holds the first lens 11 is screwed onto the annular adjusting ring 62. Next, the annular adjusting ring 62 is mounted in the first lens barrel 13. At this time, the three bayonet projections 66 are fitted into the three bayonet grooves 64 that are selected arbitrarily. Thereby, the first lens 11 is mounted in the first lens barrel 13.

Then, with regard to the optical axis adjusting operation, first, the lens frame 60 is rotated within the annular adjusting ring 62 via screw threads 63 so that the lens frame 60 is moved forward and backward within the annular adjusting ring 62 in the direction of the optical axis 20, which adjusts the positioning of the lens 11 along the optical axis 20. At this time, the annular adjusting ring 62 does not rotate with the lens frame 60 because the rotation regulating stopper 70 is engaged with the opening partially defined by end surface 73 formed on the inner flange 72 so as to prevent rotation of the annular adjusting ring 62.

Next, whether the optical axis of the first lens 11 and the optical axis 20 of the CCD (not shown) match in this state is confirmed. If they do not match, the engagement of the rotation regulating stopper 70 with the opening partially defined by end surface 73 formed on the inner flange 72 is released by a jig. Then the annular adjusting ring 62 is rotated so as to release the bayonet fitting, and the annular adjusting ring 62 is removed from the first lens barrel 13.

Then, the annular adjusting ring is rotated 120 degrees about the optical axis in order to align the bayonet projections 66 with different bayonet grooves 64 and the annular adjusting ring 62 is again mounted in the first lens barrel 13. This remounting results in a slight displacement of the first lens 11 in a plane perpendicular to the optical axis so that the optical axis of the first lens 11 and the optical axis 20 of the CCD match.

Thus, the lens barrel device 2 enables adjustment and alignment of the optical axis of the first lens 11 with the optical axis 20 of the CCD without requiring leaf springs, as taught in the prior art. Rather, the elastic engagement component 68 elastically engages with the first lens barrel 13 and the rotation regulating stopper 70. Th elastic engagement component 68 and the rotation regulating stopper 70 are integrally formed with the annular adjusting ring 62.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A lens barrel device comprising:

a lens that includes an optical axis;

a lens frame that holds said lens and that includes a screw thread on its outer periphery;

an annular adjusting ring that includes a screw thread on its inner periphery for mating with the screw thread of the lens frame so that said lens frame translates generally in the direction of said optical axis relative to said annular adjusting ring when said lens frame is rotated relative to said annular adjusting ring with the screw thread of the annular adjusting ring engaged with the screw thread of the lens frame;

a lens barrel that includes a first coupling structure on its inner periphery;

a second coupling structure on the outer periphery of said annular adjusting ring for connecting with said first coupling structure in order to align said annular adjusting ring and said lens barrel generally along said optical axis; wherein said first coupling structure includes a first inner wall surface that extends generally perpendicular to said optical axis when said lens, said lens frame, said annular adjusting ring, and said lens barrel are assembled together; and said second coupling structure includes an elastic engagement part for elastically engaging with said first inner wall when said lens, said lens frame, said annular adjusting ring, and said lens barrel are assembled together and a regulating member, separate from said elastic engagement part, for separately regulating the rotational position of said annular adjusting ring generally about said optical axis relative to said lens barrel when said lens, said lens frame, said annular adjusting ring, and said lens barrel are assembled together.

2. The lens barrel device of claim 1, wherein:

said inner wall is formed on a first inner peripheral flange of said lens barrel;

said first coupling structure further includes a second inner peripheral flange on the inner periphery of said lens barrel; and the first and second inner peripheral flanges define a groove for receiving a first portion of said second coupling structure.

3. The lens barrel device of claim 2, wherein said second inner peripheral flange includes an opening for receiving a second portion of said second coupling structure.

4. The lens barrel device of claim 3, wherein said elastic engagement part includes a semispherical engagement component.

5. The lens barrel device of claim 4, wherein said opening defines an end surface of said second inner peripheral flange, and said end surface includes a groove for receiving a jig for releasing said second coupling structure from said first coupling structure.

6. The lens barrel device of claim 3, wherein said opening defines an end surface of said second inner peripheral flange, and said end surface includes a groove for receiving a jig for releasing said second coupling structure from said first coupling structure.

7. The lens barrel device of claim 3, wherein the first and second coupling structures are part of a bayonet connection between said annular adjusting ring and said lens barrel.

8. The lens barrel device of claim 2, wherein said first portion includes said elastic engagement part.

9. The lens barrel device of claim 8, wherein said second inner peripheral flange includes an opening for receiving a second portion of said second coupling structure.

10. The lens barrel device of claim 9, wherein said elastic engagement part includes a semispherical engagement component.

11. The lens barrel device of claim 10, wherein said opening defines an end surface of said second inner peripheral flange, and said end surface includes a groove for receiving a jig for releasing said second coupling structure from said first coupling structure.

12. The lens barrel device of claim 9, wherein said opening defines an end surface of said second inner peripheral flange, and said end surface includes a groove for receiving a jig for releasing said second coupling structure from said first coupling structure.

13. The lens barrel device of claim 8, wherein said elastic engagement part includes a semispherical engagement component.

14. The lens barrel device of claim 13, wherein said opening defines an end surface of said second inner peripheral flange, and said end surface includes a groove for receiving a jig for releasing said second coupling structure from said first coupling structure.

15. The lens barrel device of claim 8, wherein said opening defines an end surface of said second inner peripheral flange, and said end surface includes a groove for receiving a jig for releasing said second coupling structure from said first coupling structure.

16. The lens barrel device of claim 8, wherein the first and second coupling structures are part of a bayonet connection between said annular adjusting ring and said lens barrel.

17. The lens barrel device of claim 2, wherein said elastic engagement part includes a semispherical engagement component.

18. The lens barrel device of claim 2, wherein the first and second coupling structures are part of a bayonet connection between said annular adjusting ring and said lens barrel.

19. The lens barrel device of claim 1, wherein said elastic engagement part includes a semispherical engagement component.

20. The lens barrel device of claim 1, wherein the first and second coupling structures are part of a bayonet connection between said annular adjusting ring and said lens barrel.

* * * * *